United States Patent
Chodura et al.

(10) Patent No.: US 8,800,699 B2
(45) Date of Patent: Aug. 12, 2014

(54) DRIVE ARRANGEMENT FOR AN ELECTRIC VEHICLE

(75) Inventors: Hartmut Chodura, Stuttgart (DE); Guan Chew, Bietigheim-Bissingen (DE); Steffen Maurer, Stuttgart (DE); Patrik Gisch, Heimsheim (DE); Miroslaw Oslislok, Leonberg (DE); Ralf Bauer, Neckarsulm (DE); Stefan Bobbo, Hochdorf-Eberdingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 242 days.

(21) Appl. No.: 13/018,781

(22) Filed: Feb. 1, 2011

(65) Prior Publication Data

US 2011/0192660 A1 Aug. 11, 2011

(30) Foreign Application Priority Data

Feb. 5, 2010 (DE) .......................... 10 2010 007 642

(51) Int. Cl.
*B60K 6/42* (2007.10)
*B60K 1/02* (2006.01)
*B60K 1/04* (2006.01)

(52) U.S. Cl.
USPC .................... 180/65.22; 180/65.1; 180/65.21; 180/68.5; 180/65.6

(58) Field of Classification Search
CPC .............. B60K 6/42; B60K 1/02; B60K 1/04
USPC .................... 180/65.22, 65.6, 65.7, 65.1, 68.5
See application file for complete search history.

(56) References Cited

U.S. PATENT DOCUMENTS

| | | | | |
|---|---|---|---|---|
| 5,427,193 | A * | 6/1995 | Avakian | 180/65.51 |
| 6,024,182 | A * | 2/2000 | Hamada et al. | 180/6.28 |
| 6,328,123 | B1 * | 12/2001 | Niemann et al. | 180/65.51 |
| 7,083,014 | B2 | 8/2006 | Forster | |
| 7,313,469 | B2 | 12/2007 | Wobben | |
| 7,363,995 | B2 * | 4/2008 | Downs et al. | 180/65.1 |
| 7,527,114 | B2 | 5/2009 | Wendl | |
| 2003/0127260 | A1 | 7/2003 | Angeles | |
| 2006/0289224 | A1 * | 12/2006 | Ono et al. | 180/311 |
| 2007/0023211 | A1 | 2/2007 | Keller | |
| 2007/0037650 | A1 | 2/2007 | Wessely | |
| 2010/0025131 | A1 * | 2/2010 | Gloceri et al. | 180/65.28 |

FOREIGN PATENT DOCUMENTS

| | | |
|---|---|---|
| DE | 3725620 | 2/1989 |
| DE | 296 11 867 | 10/1996 |
| DE | 20213670 | 2/2004 |
| DE | 102009036299 | 2/2011 |

* cited by examiner

*Primary Examiner* — Hau Phan
*Assistant Examiner* — Bryan Evans
(74) *Attorney, Agent, or Firm* — Gerald E. Hespos; Michael J. Porco; Matthew T. Hespos

(57) ABSTRACT

A drive arrangement for an electric vehicle has an axle drive device of a portal design with two electric machines for driving the wheels of an axle of the electric vehicle, and at least one electric energy store that can be discharged when an electric machine is operated as a motor and/or can be charged when an electric machine is operated as a generator. The drive arranged is characterized in that the two electric machines (11) of the axle drive device (10) are combined with a respectively assigned transmission (12) in an electric axle to drive the individually suspended wheels (2) of the axle by means of, in each case, one articulated shaft flange (13) via a respective articulated shaft. Frequency converters assigned respectively to the two electric machines are combined in a converter unit.

7 Claims, 3 Drawing Sheets

DRIVE ARRANGEMENT FOR AN ELECTRIC VEHICLE

CROSS-REFERENCE TO RELATED APPLICATION

This application claims priority under 35 USC 119 to German Patent Application No. 10 2010 007 642.2, filed on Feb. 5, 2010, the entire disclosure of which is incorporated herein by reference.

BACKGROUND OF THE INVENTION

1. Field of the Invention

The invention relates to a drive arrangement for an electric vehicle.

2. Description of the Related Art

DE 296 11 867 U1 discloses a chassis for a utility vehicle with a portal axle and a wheel rotatably mounted at each of the two ends of the portal axle. Each wheel is driven by an electric traction motor installed in the portal axle. This portal axle is a rigid axle that is relatively heavy and provides only a low level of comfort.

The object of the invention is to improve the generic portal axle and to increase the level of comfort.

SUMMARY OF THE INVENTION

The invention relates to a drive arrangement for an electric vehicle. The drive arrangement is an axle drive device that has two electric machines combined with a respectively assigned transmission in an electric axle to drive individually suspended wheels of the axle by means of, in each case, one articulated shaft flange via a respective articulated shaft. Additionally, two frequency converters are assigned to the respective electric machines and are combined in a converter unit. Thus, a drive unit for an electric vehicle is formed in an easy way by integrating the two electric machines and the respectively assigned transmissions in a common unit that defines the electric axle. The guidance of the wheel is not influenced by the weight of the drive unit due to the separation of the drive unit from a wheel-guiding unit. The chassis, in particular the individual wheel suspension of the wheels therefore can be adopted from a conventional vehicle. Frequency converters are necessary for operating the respective electric machine. However, in accordance with the invention, the frequency converters are combined in a converter unit. This minimizes the number of necessary components and permits a reduction in the high voltage lines used.

The invention will now be presented in more detail on the basis of a drawing.

DETAILED DESCRIPTION OF THE PREFERRED EMBODIMENTS

Figure 1:
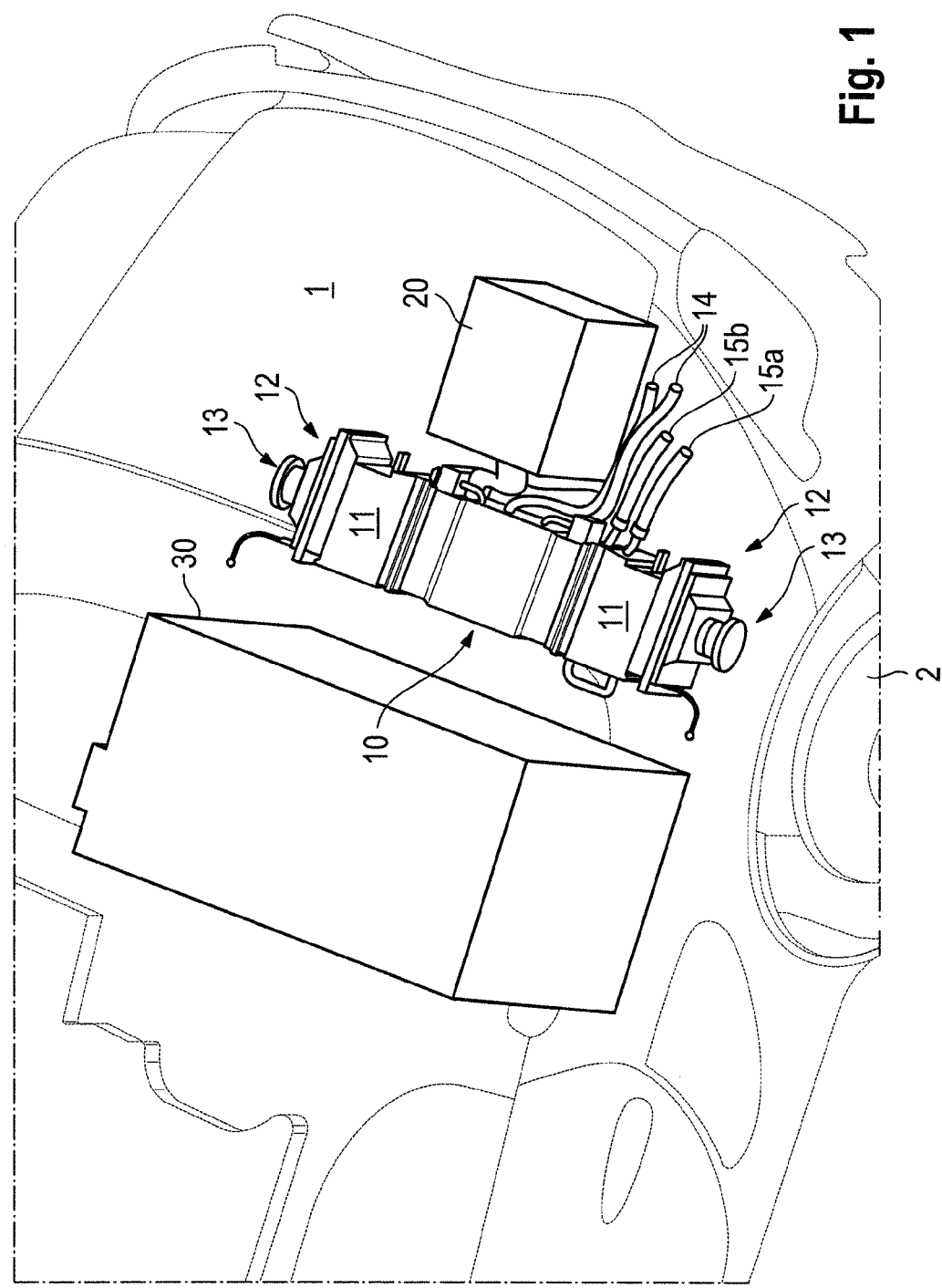
FIG. 1 is a schematic top perspective view of a drive arrangement according to the invention.
Figure 2:
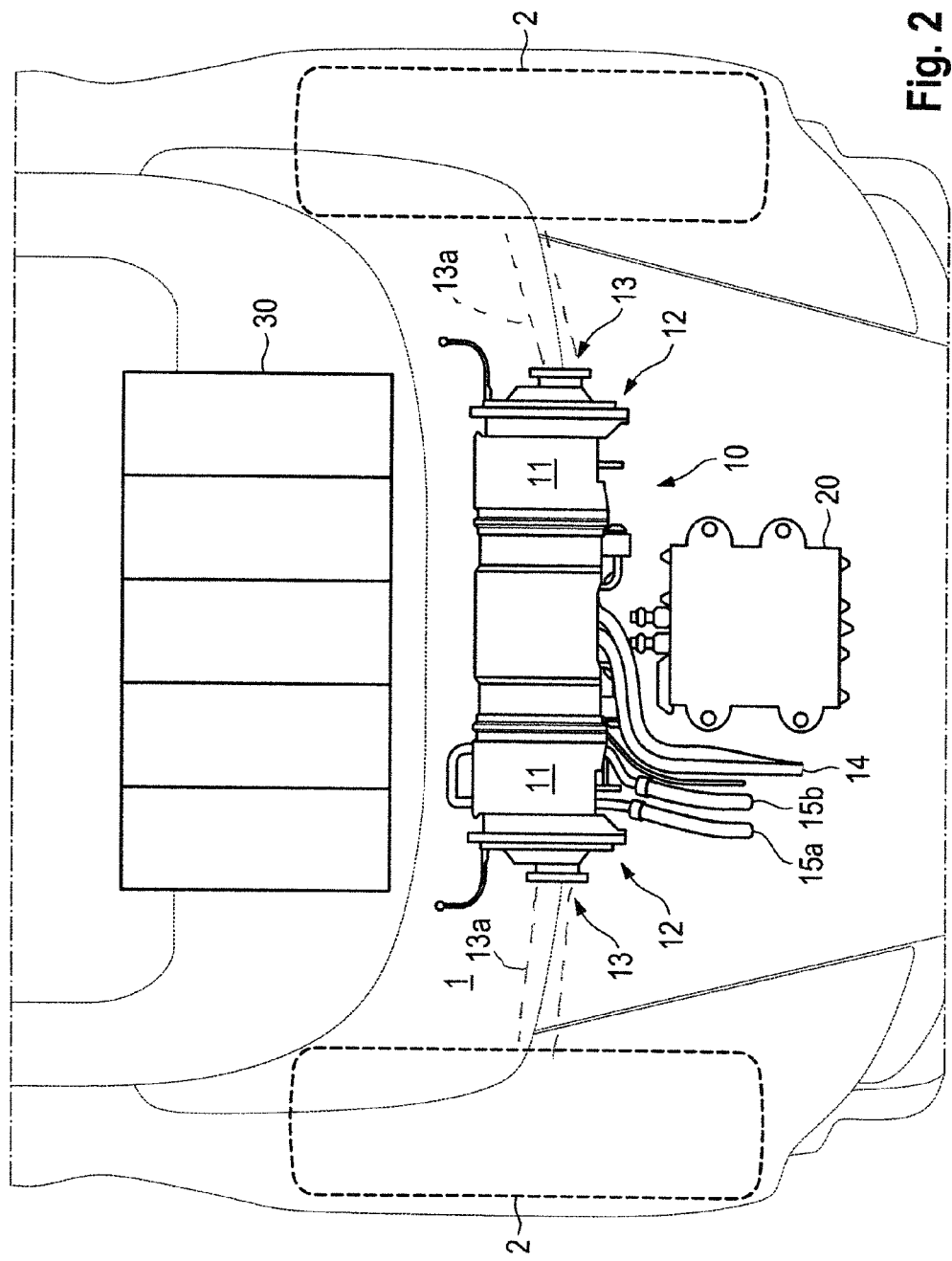
FIG. 2 is a schematic plan view of the drive arrangement of FIG. 1.
Figure 3:
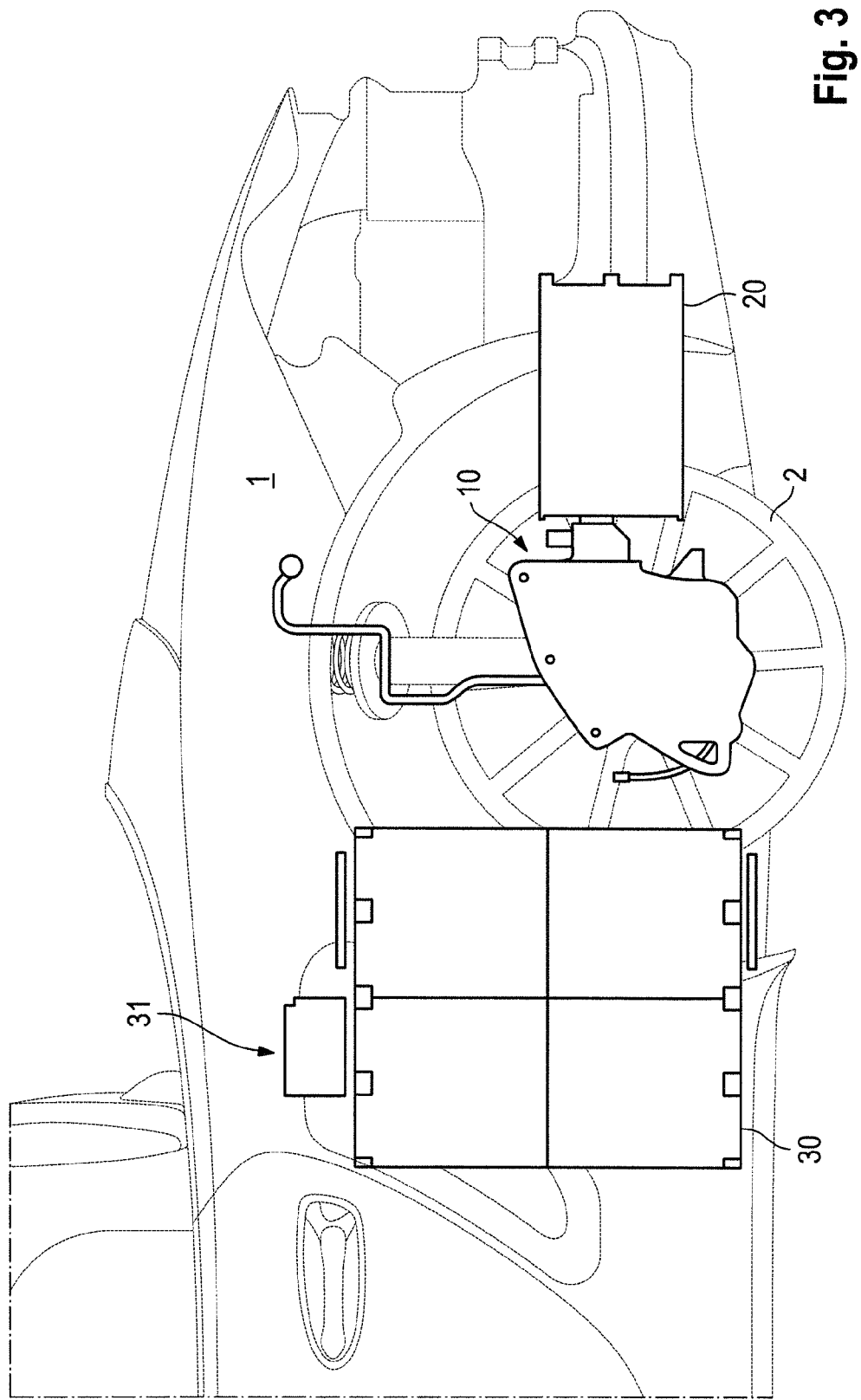
FIG. 3 is a schematic side view of the drive arrangement of FIGS. 1 and 2.

A vehicle 1 in accordance with the invention includes an electric axle 10, a converter unit 20 and an electric energy store 30, as illustrated in FIGS. 1 to 3. The electric axle 10 illustrated in this embodiment is a rear axle of an electric vehicle. The electric axle 10 comprises two electric machines 11 that are arranged coaxially in a common housing. The electric machines 11 preferably are permanently excited synchronous machines to ensure that they can be actuated effectively. Each electric machine 11 drives a respective articulated shaft flange 13 via an associated transmission 12, which comprises a spur gear stage. The articulated shaft flange 13 is provided for connection to an individually suspended wheel 2 via an articulated shaft 13a. A wheel-guiding unit of the individually suspended wheel 2 comprises, for example, conventional front-axle crossmembers, front-axle crosslinks and vibration-damped McPherson strut axles. This produces an electric portal axle with a high level of comfort in an electric vehicle.

The electric axle 10 also comprises a cooling device so that a coolant, such as water, is fed in via a feed line 15a, and the heated coolant is discharged again via a discharge line 15b.

The electric axle 10 with the two coaxially arranged electric machines 11 is integrated directly into the rear axle of the electric vehicle in this embodiment. The housing of the electric axle 10 is screwed, for example, to longitudinal members or crossmembers of the electric vehicle. The low center of gravity as a result of the installation position, i.e. the portal arrangement owing to the spur gear stage around which the respective transmission 12 engages, is highly advantageous for the movement dynamics. Each electric machine 11 drives an associated wheel 2. In this embodiment, the electric power of an electric machine 11 is 60 kilowatts and gives rise to a maximum drive torque of 80 Newton meters. Each electric machine 11 also has a position sensor that determines the precise position of the rotor for optimum operation. Each electric machine 11 is supplied with a suitable alternating current via terminals 14 on the electric axle 10.

The forces are transmitted from each electric machine 11 to a respective wheel 2 via, in each case, a hydraulic multi-disk clutch (not illustrated) that permits precise transmission of force. The multi-disk clutches are closed permanently and are controlled automatically. For safety reasons a multi-disk clutch has to be opened by the driver by means of an operator control to decouple a respective electric machine 11 from a respective wheel 2. A fixed transmission reduction of the respective transmission 12 reduces the high output rotational speed of the respective electric machine 11 and transmits the torques to a wheel 2 via the respective articulated shaft flanges 13 and the articulated shafts 13a.

The converter unit 20 comprises an electronic power unit that comprises frequency converters (AC/DC transformers) for the two respective electric machines 11 of the portal axle 10 to regulate the currents for the respective electric machines 11. The frequency converters convert the alternating current of the electric machine 11 into the direct current of the electric energy store 30. The electric energy store 30 preferably is a high voltage battery, such as a lithium ion battery.

The portal axle 10 and the converter unit 20 have a low-temperature water cooling circuit. Cooling ducts for the cooling circuit are accommodated in the housing of the portal axle and have a feed line 15a and a discharge line 15b.

The electric currents are conducted via special high-voltage cables between the electric axle 10, the converter unit 20 and the electric store 30.

The essential components of the drive arrangement, specifically the electric axle 10, the converter unit 20 and the electric energy store 30, are arranged in an optimum way in the electric vehicle. In this context, to make available a necessary quantity of energy for the electric vehicle, a relatively large and relatively heavy electric energy store 30 is necessary, for example 350 kg. In view of this weight, the electric energy store 30 is arranged near the center of gravity of the electric vehicle. It is therefore located in the central region of the electric vehicle, between the two axles. In view of the large volume, the electric energy store 30 is arranged in the rear part of the central region of the electric vehicle and specifically behind the driver's space or the driver's cab. In particular in sports vehicles, corresponding installation space is available in this region in sports cars.

The electric energy store 30 is arranged in front of the rear axle when viewed in the direction of travel. Thus, good protection is provided in the case of a rear-end crash of the electric vehicle. The greater part of the crash energy is absorbed by the chassis or the crossmember of the rear axle and the electric energy store 30 therefore is protected effectively against damage. The electric energy store 30 is not wider than the distance between the longitudinal carriers of the electric vehicle. Hence, the electric energy store 30 also is protected well in the event of a side impact of the electric vehicle. In this case, the longitudinal carriers absorb the corresponding forces. The front part of the electric vehicle, with the crossmember of the front axle, forms a reliable protection of the electric energy store 30 against damage in the event of a head-on crash.

A high-performance electric vehicle is obtained due to the above-described optimization of the weight distribution. The electric energy store 30 is by far the heaviest component of the drive arrangement, and is arranged near the center of gravity of the electric vehicle. Thus, agile handling and good freedom of the electric vehicle from twisting are obtained. Furthermore, the arrangement permits the use of an individual compact electric energy store 30. This provides advantages in terms of cooling and cabling.

The converter unit 20 also is arranged in the rear region of the electric vehicle. Thus, the necessary cabling between the converter unit 20, the portal axle 10 and the electric energy store 30 is minimized. The converter unit 20 is arranged as low as possible for further optimizing weight distribution. Such a space preferably is behind the electric axle 10 when viewed in the direction of travel. The converter unit 20 comprises both frequency converters. Thus, just a single high-voltage cable is necessary between the electric energy store 30, arranged in front of the electric axle 10, and the converter unit 20. This high-voltage cable permits direct current to flow between the converter unit 20 and the electric energy store 30. The converter unit 20 then converts the direct current into two alternating currents that are suitable for the respective electric machines 11. The converter unit 20 is positioned so that its electrical terminals for the alternating current which is made available by a respective frequency converter are positioned near to the terminals 14 of the electric axle to reduce the required cables even more.

The arrangement of the components therefore permits an ideal combination between crash safety and performance. All components are positioned precisely in a way so that the center of gravity is as low as possible and the required high-voltage cabling is as short as possible. Minimizing the high-voltage cabling results in a further reduction in weight and improved efficiency of the drive arrangement.

The electric energy store 30 is accessed in the region of the underfloor of the electric vehicle. This permits improved integration of the components of the drive arrangement into the electric vehicle, for example underneath the vehicle body components, as well as a more pleasing design.

A further improvement through increased use of identical components is obtained if the second axle of the electric vehicle also is provided as an electric axle 11. In particular, two identical electric portal axles, each with an assigned identical converter unit 20, can then be installed as identical components. This results in an electric vehicle whose four wheels can be driven separately by a respective electric machine. This electric vehicle also has a high level of comfort by virtue of the fact that the conventional chassis of a vehicle can be used for the individual suspension of the wheels.

What is claimed is:

1. A drive arrangement for an electric vehicle having an underfloor, the electric vehicle comprising:
    an axle drive device having two electric machines for driving two wheels of a rear axle of the electric vehicle, the two electric machines of the axle drive device being aligned along an axis and being combined respectively with two transmissions in an electric axle to drive the individually suspended wheels of the axle by an articulated shaft flange via a respective articulated shaft, the electric axle being secured in the electric vehicle so that a lower part of the electric axle is at a height substantially aligned with the underfloor of the electric vehicle;
    at least one electric energy store that can be discharged when at least one of the electric machines is operated as a motor and can be charged when at least one of the electric machines is operated as a generator, the electric energy store being arranged in a rear region of the electric vehicle at a position in front of the electric axle and behind a driver's space of the electric vehicle, the electric energy store being at a height position so that a lower surface of the electric energy store substantially aligns with the lower part of the electric axle; and
    frequency converters assigned respectively to the two electric machines and being combined in a converter unit, the frequency converters converting alternating current of the electric machines into direct current for the electric energy store, the converter unit being arranged in the rear region of the vehicle, behind the electric axle, whereby height positions of the electric energy store and the electric axle relative to the underfloor of the electric vehicle provide a low center of gravity.

2. The drive arrangement of claim 1, wherein the electric energy store has a width that does not exceed a distance between longitudinal carriers of the electric vehicle.

3. The drive arrangement of claim 1, wherein the electric energy store has an access in the underfloor of the electric vehicle.

4. An electric sports car, comprising:
    an electric axle having first and second electric machines disposed substantially back to back along a transverse direction of the electric vehicle, first and second transmissions combined respectively with the first and second electric machines, first and second articulated shaft flanges joined respectively by the first and second transmissions, first and second articulated shafts joined respectively to the first and second articulated shaft flanges and first and second individually suspended rear wheels joined respectively to the first and second articulated shafts so that first and second electric machines can drive the respective first and second wheels, the electric axle being disposed so that a lower part of the electric axle is at a height substantially aligned with an underfloor of the electric sports car;
    at least one electric energy store that can be discharged to provide power to at least one of the first and second electric machines when at least one of the first and second electric machines is operated as a motor and that can be charged when at least one of the first and second electric machines is operated as a generator, the electric energy store being located forward of the electric axle and rearward of a passenger compartment of the vehicle and so that a lower end of the energy store is substantially aligned with the lower part of the electric axle; and a converter unit with frequency converters assigned respectively to the two electric machines, the frequency converters converting alternating current of the electric machines into direct current for the electric energy store, the converter unit being substantially adjacent the electric axle and on a side of the electric axle opposite the electric energy store.

5. The electric sports car of claim 4, wherein the electric energy store has a width that does not exceed a distance between longitudinal carriers of the electric vehicle.

6. The electric sports car of claim 4, wherein the electric energy store has an access in the region of the underfloor of the electric vehicle.

7. The electric sports car of claim 4, wherein the first and second electric machines are incorporated into a housing, the electric axle further comprising a low-temperature water cooling circuit communicating with the housing for cooling the electric machines.

\* \* \* \* \*